Sept. 10, 1963
M. J. BROWN
3,103,581
TRANSMISSION LOSS COMPUTER
Filed Sept. 29, 1960
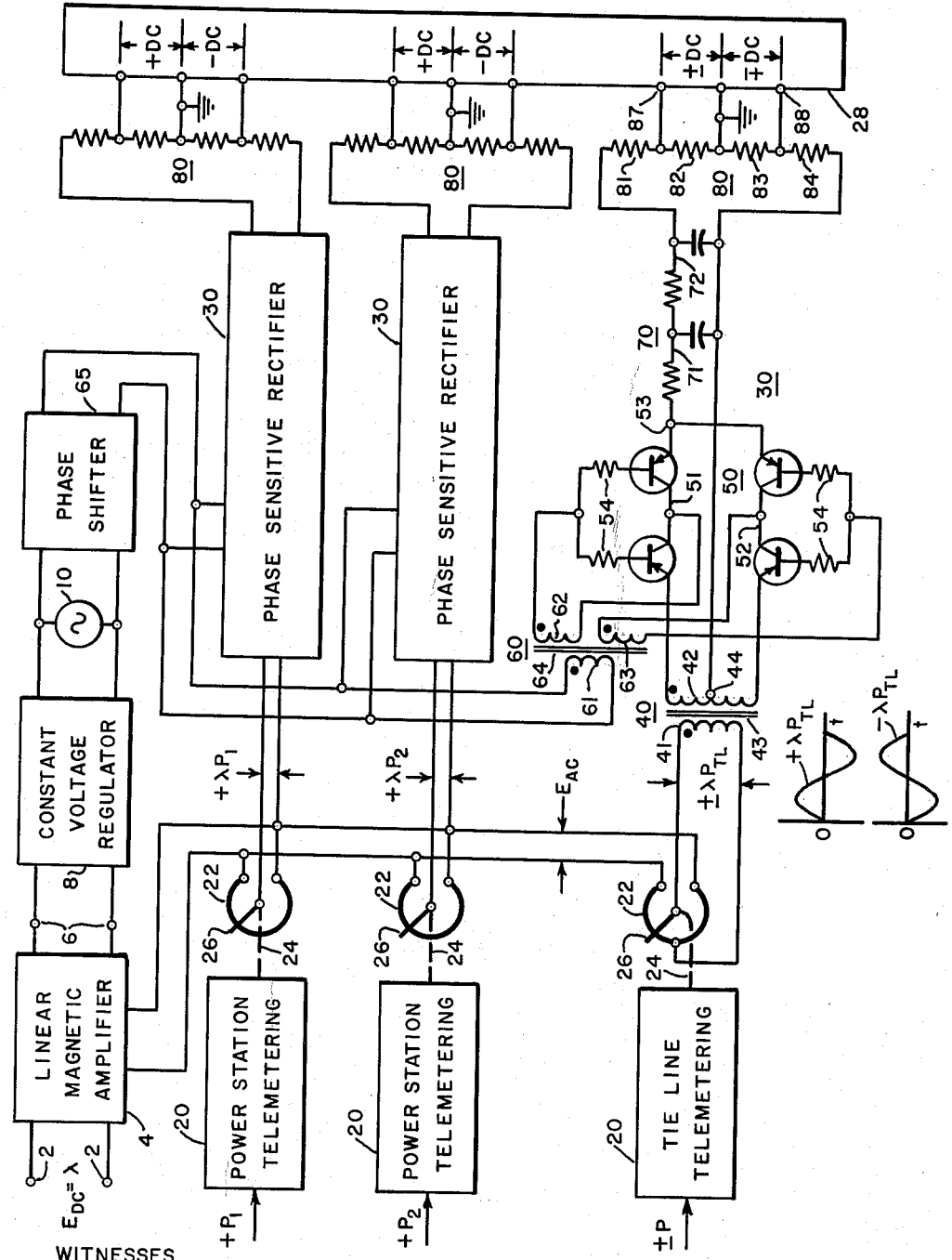
WITNESSES
INVENTOR
Myron J. Brown
BY
ATTORNEY United States Patent Office 3,103,581
Patented Sept. 10, 1963

3,103,581
TRANSMISSION LOSS COMPUTER
Myron J. Brown, Forest Hills, Pa., assignor to Westinghouse Electric Corporation, East Pittsburgh, Pa., a corporation of Pennsylvania
Filed Sept. 29, 1960, Ser. No. 59,245
11 Claims. (Cl. 235—185)

The present invention relates generally to transmission loss computers and more particularly relates to a power transmission loss computer having an analog output indicating the magnitude and direction of power flow between a generating station or tie line and an electrical utility system.

Conventional transmission loss computers require at least two potentiometers or slide wires to properly obtain the cost of power transmission loss between a generating station or tie line and the system. However, while one potentiometer may be available in recording instruments of the type used for computing a transmission loss, a second potentiometer may only be obtainable for such use at considerable extra cost. The transmission loss computer in accordance with the present invention allows proper operation with only one potentiometer or slide wire.

An object of the present invention is to provide a transmission loss computer requiring less potentiometers than conventional arrangements.

Another object of the present invention is to provide a transmission loss computer in which an alternating current signal indicating the incremental system cost of power, represented by its symbol $\lambda$, is multiplied by a power flow signal, the resultant product being rectified to analog form having a magnitude proportional to transmission loss of the power flow and a polarity in accordance with the direction of such power flow.

In practicing this invention, an automatic dispatching system, or the like, provides to the transmission loss computer a first power parameter, namely, a direct current voltage $E_{dc}$ proportional to the incremental system cost of power lambda ($\lambda$), and a second power parameter, $(+P)$ or $(-P)$, namely, the magnitude and direction of power flow to or from the system. The transmission loss computer then senses the transmission loss of each station or tie line and provides an indication of the cost of losses incurred in transmitting the amount of power flowing and the direction of power flow. The indicator product $\lambda P$ will, for instance, have a plus sign indicating power flow from the monitored station to the system or from a tie line to the system and have a negative sign indicating power flow from the system to a tie line. Therefore, the transmission loss of each said station or tie line may be supplied to a transmission loss matrix capable of determining the cost of the total power transmission losses under any indicated power flow and cost increment.

The sole FIGURE is a diagrammatic view of an illustrative embodiment of the present invention wherein wave shapes at appropriate points have been indicated.

The incremental system cost of power $\lambda$ is provided to the transmission loss computer from an automatic dispatching system as described and claimed in my Patent No. 2,888,575, issued May 26, 1959, entitled "Automatic Dispatching System" and assigned to the same assignee as the present invention. The direct current voltage equivalent to $\lambda$ from such a system is identified as $E_{dc}$ connected across input terminals 2 of a linear magnetic amplifier 4. To amplify $\lambda = E_{dc}$ to an alternating current voltage indicative of $\lambda$, the linear magnetic amplifier 4 has connected across its input terminals 6 a constant alternating current voltage input resulting from a constant voltage regulator 8 connected to an alternating current source 10. The output of the linear magnetic amplifier 4 provides an alternating current incremental system cost of power $\lambda$ equal to $E_{ac}$.

A power magnitude and flow signal from each power station and tie line may be provided by telemetering equipment of an automatic dispatch system as described and claimed in my aforementioned patent. Referring again to the sole figure, power flow into the system has been designated as $+P$ while power flow out of the system has been designated as $-P$. Since a tie line is capable of power flow in either direction, the power flow signal to telemetering equipment 20 associated with the tie line may either have a positive or negative indicator.

A single slide wire or potentiometer 22 having a wiper arm 26 is associated with each station or tie line and operates as a multiplier of power parameter input signals.

Considering first the tie line connection, the telemetering equipment 20 through its mechanical linkage 24 drives the wiper arm 26 to assume a position in accordance with the magnitude and direction of power flow between the tie line and the monitored system. The incremental system cost of power $\lambda$ appears across the potentiometer 22 and is designated as $E_{ac}$. The output of the potentiometer 22 is the product of $\lambda$ and P taken from the center tap of the potentiometer and one end terminal. It can be seen that when the wiper arm 26 assumes a position on the opposite side of the center tap the phase of the product $\lambda P$ will be changed so that $+\lambda P$ would become $-\lambda P$ indicating that the phase of the alternating current output from the potentiometer has been reversed. Reversal of the phase from $+\lambda P$ to $-\lambda P$ then indicates change from power flow into the system to power flow out of the system to the tie line. Such phase reversal can be seen by comparing the wave forms $+\lambda P$ and $-\lambda P$. The amplitude of the wave form is functionally related to the amount of power flow and the cost of the losses incurred in transmitting such a power magnitude, while the polarity sign or phase of the waveform, is indicative of power flow into or out of the system.

A phase sensitive rectifier circuit 30 connects the output of the potentiometer 22 in analog form to a transmission loss matrix 28. The phase sensing rectifier circuit 30 comprises generally transformer means 40, transistor means 50, firing means 60, and filtering means 70. Voltage divider means 80 connected across the filter means 70 provides the appropriate analog signal to the transmission loss matrix 28.

The transformer means 40 more particularly comprises a first primary winding 41 and a center-tapped secondary winding 42 inductively disposed on a magnetic core 43. The windings are marked in accordance with the polarity dot convention, namely the dot indicating the polarity of the instantaneous voltage in the various windings. A center-tapped connection 44 is provided on the secondary winding 42. The alternating current signal $+\lambda P$ or $-\lambda P$ resulting from the potentiometer 22 is connected across the primary winding 41.

The transistor means 50 comprises a first transistor circuit 51 and a second transistor circuit 52 each illustrated as comprising two serially connected transistors. The collectors of each transistor section are connected together. One emitter of each transistor section is connected to opposite ends respectively of the secondary winding 42 while the other emitter of each section is commonly connected together at junction 53. The base electrodes of each transistor section are joined together through their respective base current limiting resistors 54. It can be seen that the center tap connection 44 and the junction 53 provide output terminals on the transistor means 50.

The firing circuit 60 comprises a second primary winding 61, a second secondary winding 62 and third secondary winding 63 inductively disposed on the magnetic core 64. The second secondary winding 63 is connected across the base-collector circuit of the transistor section 51. The third secondary winding 63 is connected across the base-collector circuit of the transistor section 52. A phase shifter 65 is operative to provide excitation from the alternating current source 10 to the primary winding 61. The phase shifter 65 is set to synchronize the excitation to the second primary winding 61 with the $E_{ac}$ phase input to the first primary winding 41. Where desirable, the phase shifter 65 may be omitted particularly when the phase attenuation through the linear magnetic amplifier 4 and constant voltage regulator 8 is negligible.

Transistors of the PNP type have been illustrated. Such transistors are rendered conductive upon the base electrode being of a negative potential with respect to the collector electrode.

It can be seen that when the dotted end of the primary winding 41 is of positive polarity as determined by the phase of the $\lambda P$ signal that the dotted end of the secondary winding will also be of positive polarity. The same is true with respect to the second primary winding 61 and the second and third secondary windings 62 and 63 respectively. The voltages induced in the second and third secondary windings 62 and 63 will result in the transistor section 51 or transistor section 52 being rendered conductive for a given half cycle of the polarizing voltage across the second primary winding 61. Since the polarized voltage and the input voltage are synchronized by means of the phase shifter 65, the resultant output of the phase sensitive rectifier will be a pulsating direct current of a polarity indicating the phase of the input $\lambda P$ and a magnitude proportional to the magnitude of the input $\lambda P$.

Filtering means 70 comprising RC coupling circuits 71 and 72, filters the pulsating direct current and provides a direct current voltage across the voltage divider circuit 80 having a magnitude and polarity indicative of the cost of transmitting power between the tie line and the monitored system and the direction of such power flow.

The voltage divider circuit comprises four serially connected resistors 81, 82, 83 and 84. The junction between resistors 82 and 83 is grounded commonly with the transmission loss matrix. The junction between resistors 81 and 82 is brought out to an input terminal of the transmission loss matrix at 87. The junction between resistors 83 and 84 is brought out to an input terminal 88 of the matrix. The voltage appearing between the input terminal 87 and the ground connection, as well as the voltage appearing between the input terminal 88 and the ground connection provides a measure of the power transmission loss of power flow to or from the system. As illustrated, it can be seen that the voltage between terminal 87 and ground may be positive while the voltage between ground and terminal 88 may be negative for a given direction of power flow. A reversal of direction of tie line power flow will provide a reversal of the voltage polarity of the output terminal 87 with respect to ground, as well as of the output terminal 88 with respect to ground. In either case the magnitude of the voltage from the associated terminal to ground provides a measure of the transmission loss of the power flow.

Since power flow from a generating station to the monitored system is always in the predetermined direction, a phase sensitive rectifier as shown at 30 may be omitted, where desired, since the phase is always sensed to indicate positive flow of power to the manitored system. However, nothing may preclude the use of such a phase sensitive rectifier in the interests of maintaining uniformity within the transmission loss computer.

While the present invention has been described with a certain degree of particularity for the purposes of illustration, it is to be understood that all equivalents, alterations, and modifications within the spirit and scope of the invention are herein meant to be included.

I claim as my invention:

1. Computer apparatus for determining the cost of power transmission loss for each tie line in a power system comprising, in combination, multiplier means for each tie line connection and including input means and output means; said input means adapted to receive a first power parameter signal and a second power parameter signal; said multiplier means providing an output signal having the frequency of said first power parameter signal; and phase sensitive rectifier means operably connected to said output means and providing an output voltage having a polarity and magnitude functionally related to the product of said first signal and said second signal.

2. Computer apparatus for determining the cost of power transmission loss for each power station and tie line in a power system comprising, in combination, multiplier means for each power station and tie line connection and including input means and output means; said input means adapted to receive a first power parameter signal and a second power parameter signal; said multiplier means providing an output signal having the frequency of said first power parameter signal; and phase sensitive rectifier means operably connected to said output means and providing an output voltage having a polarity and magnitude functionally related to the product of said first signal and said second signal.

3. Computer apparatus for determining the cost of power transmission loss for each tie line in a power system comprising, in combination, multiplier means for each tie line connection and including input means and output means; said input means adapted to receive an incremental system cost of power signal and a power flow signal; said multiplier means providing an output signal having the frequency of said incremental system cost of power signal; and phase sensitive rectifier means operably connected to said output means and providing an output voltage having a polarity and magnitude functionally related to the product of said incremental system cost of power signal and said power flow signal.

4. Computer apparatus for determining the cost of power transmission loss for each tie line in a power system comprising, in combination, multiplier means for each tie line connection and including input means and output means; said input means adapted to receive a first power parameter signal and a second power parameter signal; said multiplier means providing an output signal having the frequency of said first power parameter signal; and phase sensitive rectifier means operably connected to said output means and providing an output voltage having a polarity and magnitude functionally related to the product of said first signal and said second signal, said phase sensitive rectifier means comprising a transistor means connected in a push-pull configuration, and triggering means for rendering said transistor means conductive in response to the phase relationship of said triggering means with said output signal.

5. Computer apparatus for determining the cost of power transmission loss for each tie line in a power system comprising, in combination, multiplier means for each tie line connection and including input means and output means; said input means adapted to receive a first power parameter signal and a second power parameter signal; said multiplier means providing an output signal having the frequency of said first power parameter signal; and phase sensitive rectifier means operably connected to said output means and providing an output voltage having a polarity and magnitude functionally related to the product of said first signal and said second signal, said phase sensitive rectifier means comprising a transistor means connected in a push-pull configuration, and triggering means for rendering said transistor means conductive in response to the phase relationship of said triggering means with said output signal, said triggering means being synchronized with said output signal to render said transistor means conductive in accordance with said output signal.

6. Computer apparatus for determining the cost of power transmission loss for each tie line in a power system comprising, in combination, potentiometer means for each tie line connection to the system and including input means and output means; said input means adapted to receive an incremental system cost of power signal and a power flow signal; said potentiometer means providing an output signal having the frequency of said incremental system cost of power signal; phase sensitive rectifier means operably connected to said output means and providing an output voltage having a polarity and magnitude functionally related to the transmission loss of each said tie line; said phase sensitive rectifier means comprising transistor means, triggering means for rendering said transistor means conductive in accordance with the phase of said output signal; and means for filtering the signal through said transistor means from a pulsating direct current output to an analog signal having a magnitude and polarity which is proportional to said transmission loss of each said tie line.

7. Computer apparatus for determining the cost of power transmission loss for each tie line in a power system comprising, in combination, potentiometer means for each tie line connection to the system and including input means and output means; said input means adapted to receive an incremental system cost of power signal and a power flow signal from each tie line; said potentiometer means providing an output signal having the frequency of said incremental system cost of power signal; phase sensitive rectifier means operably connected to said output means; said phase sensitive rectifier means comprising transformer means including a primary winding and a center-tapped secondary winding, transistor means operably connected in series circuit relationship with each half of said secondary winding, means for rendering said transistor means conductive in accordance with the frequency and phase of the voltage across said center-tapped secondary winding, circuit means for connecting each end of said secondary winding together and providing an output across said end connections and the center-tapped connection responsive to the conduction of said transistor means, and filter means responsive to the output across each said end connecton and said center-tapped connection for providing an analog voltage having a magnitude and polarity functionally related to the transmission loss of each said tie line.

8. Computer apparatus for determining the cost of power transmission loss for each tie line in a power system comprising, in combination, potentiometer means for each tie line connection to the system and including input means and output means; said input means adapted to receive an incremental system cost of power signal and a power flow signal from each tie line; said potentiometer means providing an output signal having the frequency of said incremental system cost of power signal; phase sensitive rectifier means operably connected to said output means; said phase sensitive rectifier means comprising transformer means including a primary winding and a center-tapped secondary winding, first transistor means operably connected in series circuit relationship with one-half of said secondary winding, second transistor means operably connected in series circuit relationship with the other half of said secondary winding, each said transistor means including a base-collector circuit, said means for rendering said transistor means conductive comprises a second primary winding and a second secondary winding and a third secondary winding operably connected to said transformer means, and circuit means for connecting said second secondary winding and said third secondary winding across the base-collector circuit of the first and second transistor means respectively, circuit means for connecting each end of said secondary winding together and providing an output across said end connections and the center-tapped connection responsive to the conduction of said transistor means, and filter means responsive to the output across each said end connection and said center-tapped connection for providing an analog voltage having a magnitude and polarity functionally related to the transmission loss of each said tie line.

9. In an automatic dispatching system, a transmission loss matrix means for computing total power transmission loss; means for providing a direct current voltage proportional to the incremental system cost of power; linear amplifier means for providing an alternating current signal having a magnitude proportional to said direct current voltage; potentiometer means for each power station and tie line and having a wiper arm for varying the resistance of said potentiometer means; means for setting the position of said wiper arm in accordance with the power flow of its associated power station or tie line; circuit means for connecting said alternating current signal across said potentiometer means; said potentiometer means associated with a tie line having output means operably connected between one end of said potentiometer means and a center tap of said potentiometer means; said potentiometer means associated with a power station having output means operably connected between one end of said potentiometer means and the other end of said potentiometer means; phase sensitive rectifier means asociated with each tie line connection and power station operably connected to the output means of said potentiometer means for providing an analog output signal having a magnitude and polarity proportional to the amount of power and the direction of power flow between said tie line or power station and said system; said resistance matrix means adapted to receive said analog signals and provide an output voltage having a magnitude and polarity proportional to the total system power transmission loss.

10. Computer apparatus for determining the cost of transmission loss for a tie line in a power system comprising, in combination, multiplier means for each tie line connection including input means and output means; said input means adapted to receive an incremental system cost of power signal and power flow signal; said output means providing an alternating current signal having a frequency in accordance with the frequency of said incremental system cost of power signal, a magnitude proportional to the product of said signals, and a phase angle responsive to power flow between said tie line and said system; phase sensitive rectifier means responsive to the output signal of said multiplier means for providing an analog signal having a magnitude functionally related to the power transmission loss of said tie line to a reference point in said system and a polarity responsive to the direction of power flow between said tie line and said system.

11. The apparatus of claim 10 in combination with an automatic dispatching system comprising elemetering equipment means operably connected to said multiplying means for providing said power flow signal; and resistance matrix means operably connected to receive said analog signal for computing total transmission power loss for said system.

References Cited in the file of this patent
UNITED STATES PATENTS 2,871,375   Early _____ Jan. 27, 1959
2,888,575   Brown et al. _____ May 26, 1959